Nov. 24, 1964  R. C. REEL  3,158,162
BLIND MAN'S WALKING CANE
Filed May 9, 1962
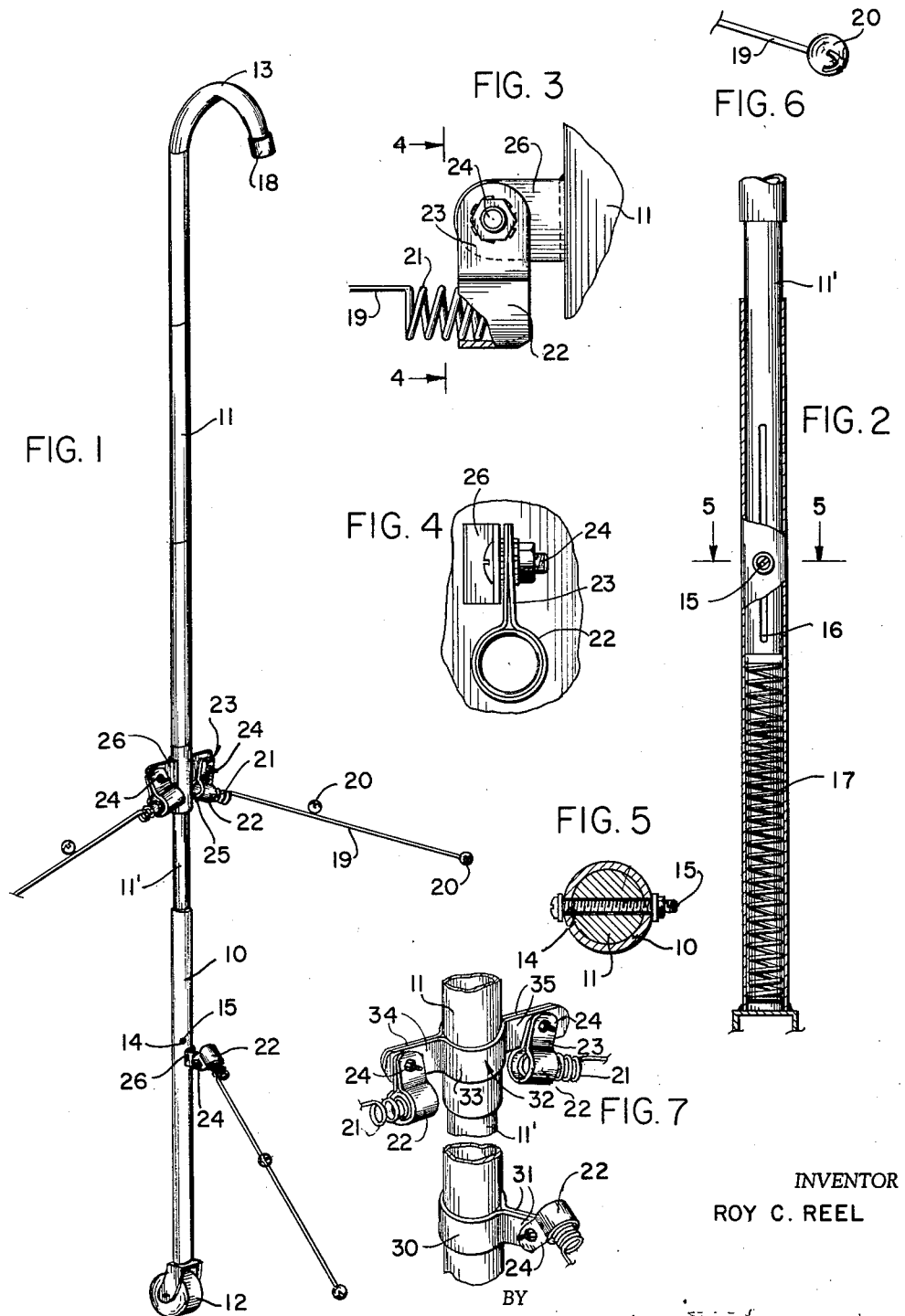
INVENTOR
ROY C. REEL
BY
ATTORNEY United States Patent Office 3,158,162
Patented Nov. 24, 1964

3,158,162
BLIND MAN'S WALKING CANE
Roy C. Reel, 814 Escambia Drive, Sanford, Fla.
Filed May 9, 1962, Ser. No. 193,376
2 Claims. (Cl. 135—47)

This invention relates to motion including movement on foot and from place to place by individuals and to equipment for facilitating such motion and for guiding persons while they are walking in or out of doors.

The invention relates particularly to movement in the dark or when light is reduced regardless of whether by fog or other manifestation of nature or obstruction to light or where the light is inadequate and limits or impairs vision.

Movement from place to place by both young and old sometimes is impeded or decelerated by limited vision, occasioned by transition from day to night, fog, or other operations of nature which reduce light in a specific place, cause shadows or exclude the sun, and when the light is excluded by natural or artificial substance or structures and which insufficiency of light at times terminates in accidents which results in personal injury and damage to property, there being inadequate means available for finding unobstructed passageway.

It is an object of the invention to provide a cane or walking stick of a construction which when used will facilitate travel on foot and when light is reduced or is inadequate obstructions to travel may be detected and avoided and shocks or jars occasioned by contact with a rigid object will be absorbed or cushioned, such walking stick or cane being provided with auxiliary detection means in the form of cat whiskers or feelers and bells or other signaling means perceptible to the senses.

Another object of the invention is to provide a cane or walking stick of general use which can be simply and inexpensively produced and which can be used when light is inadequate either because of the conditions of nature or of the sight of persons.

Other objects and advantages of the invention will be apparent from the following description taken in conjuction with the accompanying drawings wherein:

FIG. 1 is a perspective illustrating one application of the invention.

FIG. 2, a fragmentary enlarged intermediate portion thereof;

FIG. 3, an enlarged fragmentary detail illustrating the mounting of one of the feelers;

FIG. 4, a view at right angles to and on the line 4—4 of FIG. 3;

FIG. 5, a transverse section on the line 5—5 of FIG. 2;

FIG. 6, an enlarged view of one of the bells; and

FIG. 7, an enlarged fragmentary perspective illustrating a modification of the invention.

Briefly stated, the invention is a cane or walking stick in the form of a shaft with a support roller at its lower end, a crook at its upper end, and including a pair of members telescopically connected with a spring between the contacting portions providing a cushion for absorbing instead of transmitting shock when the roller sharply strikes a solid or unyielding structure, one of the telescopic members having a longitudinal slot and a bolt extending through such a slot and through the other member and preventing the members from becoming separated, a series of feelers or detectors being provided each of which is mounted to swing from a substantially parallel position along the cane or walking stick to a position substantially at right angles thereto and with each of two of such feelers or detectors located on opposite sides and mounted to extend in opposite directions and at right angles to the crook on the upper end of the cane whereby anyone using the cane may readily detect an obstruction and avoid physical contact therewith which might result in injury to the person and damage to property.

With continued reference to the drawings, the cane or walking stick of the present invention comprises a lower hollow preferably cylindrical shaft section 10 of metal or the like and an upper coresponding hollow shaft section 11 of coresponding diameter, connected by an intermediate section 11'. Such intermediate section is rigidly fixed to the lower end of the upper section 11 and is telescopically received within the lower section 10. A ground engaging support roller 12 is mounted at the lower end of the lower shaft section and the upper end of the upper shaft section is provided with a handle-forming crook 13. In order to maintain the intermediate section 11' telescoped within the lower shaft section, the lower shaft section is provided with opposed openings 14 in which is received a bolt 15 and the intermediate section is provided with a slot 16 in which said bolt is received and by which construction the parts are held in assembled relation.

Within the lower hollow shaft section 10 is contained a cushioning spring 17 against which the lower extremity of the intermediate section 11' engages.

It will be apparent that the plane of the crook and the plane of the roller are the same, the roller being mounted on an axis at right angles to such planes. Also, the crook may be provided with a cap 18 to cover the free end of the crook.

In the use of the walking stick or cane, the handle 13 is adapted to be gripped with the shaft portion forwardly and the tip rearwardly with the shaft slightly inclined and the roller and lower end of the shaft ahead of the upper end. As the roller travels forwardly, it moves freely until an obstruction is encountered and if such obstruction is of pronounced weight and rigidity, the lower end of the shaft is subjected to substantial shock. However, this shock will be cushioned and a substantial amount of the shock will be absorbed by the spring 17. In the use indicated when the roller and the shaft come in contact with an obstruction, the perception thereof is transmitted to the hand of the user as is customary in the use of any walking stick or cane except for the shock cushioning or dampening effect occasioned by the interposition of the spring 17.

In order to increase and enlarge the sense of perception by vibratory response to the handle-forming crook 13, the cane may be provided with elongated cat whiskers, feelers or detectors 19 of a slim vibratory character and such detectors may have other signaling means such as sound producing bells 20. The detectors 19 preferably are of relatively stiff wire with a coil 21 at the base of the same which is received within a sleeve 22 having a pair of lateral arms 23 and a clamping bolt 24, each sleeve having an instruck portion 25 which serves to reduce the diameter of the sleeve to obstruct the passage of the coil 21 through the sleeve. Accordingly, when any of the detector wires yieldingly strikes an obstruction druing use of the cane the shock of the impact induces mechnical vibrations therein which travel through the cane shaft to the crook handle 13 thereof to thereby increase the sense of perception of the cane user.

In order to provide a mounting for the detectors, the lower shaft section is provided with a lateral apertured arm 26 which may be welded or otherwise secured to the lower portion of the shaft and the upper shaft section is provided with a pair of such arms and to these arms the detectors are secured by bolts and nuts 24. With the detectors thus mounted, the coil spring allows some resiliency and they can be moved from a position at right angles to the shaft to a position substantially parallel to the shaft. Further, the arrangement of the detectors may be such that a lower detector is in the plane of the crook and the roller in the lower shaft portion of the cane, while two oppositely disposed detectors may be arranged at right angles to the first detector and spaced above on the upper shaft section 11.

With particular reference to FIG. 7 a modified form of the detector mounting is illustrated. A single detector may be mounted by means of a clamping ring 30 of a size to extend around the shaft and having a pair of outwardly extending lugs 31 having openings for receiving the nut and bolt 24. The lateral arms of the sleeve 22 are disposed adjacent to the lugs 31 so that when the nut is tightened on the bolt, such bolt and nut will perform the dual function of clamping the ring 30 to the shaft and clamping the sleeve 22 in fixed relation to the lugs 31. Where it is desired to adjustably secure two detectors on opposite sides of the shaft, a clamp 32 is provided comprising two identical parts, each of which has a substantially semi-cylindrical center portion 33 which terminates in outwardly projecting lugs 34 and 35. Each of the lugs 34 and 35 is provided with an opening for receiving the bolt and nut 24 in such a manner that when a detector sleeve 22 is positioned on each of the bolts and the nut of each bolt is tightened, the central portion 33 will firmly clamp the shaft and prevent vertical motion thereof.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A walking cane for facilitating locomotion by a person unable to see properly, comprising,
   a tubular shaft including a lower hollow portion which telescopically receives an upper shaft portion having a handle at its upper end,
   spring means resiliently urging said upper portion outwardly relative to said lower portion,
   means limiting the telescopic action of said shaft portions,
   a plurality of vibratory obstruction detectors mounted on said shaft and disposed in a plane substantially at right angles to the handle and each comprising,
   a relatively stiff elongated and slim wire,
   a coil formed in one end of said wire and extending along the axis thereof,
   a mounting portion for the free end of said coil,
   means fixedly mounted on said shaft having extensions thereon at opposite sides of said shaft lying in said plane substantially at right angles to said handle,
   means for pivotally attaching said mounting portion to said fixedly mounted means whereby said vibratory detectors are angularly outwardly positionable on opposite side of said shaft,
   said vibratory detectors transforming the shock of impact against obstructions during the use of the cane into induced mechanical vibrations for transmission through said shaft to the handle thereon thereby to increase the sense of perception to the user of the cane.

2. A walking cane for facilitating locomotion by a person unable to see properly, comprising,
   a tubular shaft having a handle at one end and a roller on the opposite end thereof,
   a plurality of vibratory detector members mounted on said shaft intermediate the length thereof,
   means adjustably pivotally mounting each of a pair of said detector members at a given location and on each side of said shaft for angular positioning relative thereto in a plane at right angles to said handle,
   said means including means fixedly mounted on said shaft having extensions thereon at opposite sides of said shaft lying in said plane at right angles to said handle,
   means for angularly adjustably mounting another one of said detector members on said shaft at a point spaced below said pair and in the plane of said handle,
   each of said vibratory detector members comprising an elongated relatively slim stiff wire member having a helical coil formed at one end thereof and extending along the axis thereof,
   said means for adjustably mounting each of said detector members comprising a sleeve member in which said helical coil is secured,
   each of said elongated vibratory detector members when striking an obstruction in the normal use of the cane having mechanical vibrations induced therein which are transmitted through the shaft to said handle thereon thereby to increase and enlarge the sense of perception of the cane user.

References Cited in the file of this patent

UNITED STATES PATENTS

| 1,542,894 | Langner | June 23, 1925 |
| 2,141,844 | Reznor | Dec. 27, 1938 |
| 2,528,706 | Osborn | Nov. 7, 1950 |
| 2,986,113 | Frees et al. | May 30, 1961 |
| 3,029,828 | Kravitt | Apr. 17, 1962 |

FOREIGN PATENTS

| 371,291 | France | Jan. 18, 1907 |
| 1,016,156 | France | Aug. 20, 1952 |
| 1,159,491 | France | Feb. 10, 1958 |